United States Patent [19]

Savoia

[11] Patent Number: 4,719,675
[45] Date of Patent: Jan. 19, 1988

[54] PRODUCTION OF CAPACITORS OF THE STACKED TYPE

[75] Inventor: Franco Savoia, Bologna, Italy

[73] Assignee: Arcotronics Italia S.p.A., Bologna, Italy

[21] Appl. No.: 828,128

[22] Filed: Feb. 11, 1986

[51] Int. Cl.⁴ .............................................. H01G 4/26
[52] U.S. Cl. ......................................................... 29/25.42
[58] Field of Search ............................................. 29/25.42

[56] References Cited

U.S. PATENT DOCUMENTS

| | | | |
|---|---|---|---|
| 2,654,060 | 9/1953 | Stovall, Jr. et al. | 29/25.42 X |
| 2,765,517 | 10/1956 | McGraw, Jr. | 29/25.42 |
| 3,728,765 | 4/1973 | Behn et al. | 29/25.42 |
| 4,128,927 | 12/1978 | Dahms et al. | 29/25.42 |
| 4,531,268 | 7/1985 | Rayburn | 29/25.42 |
| 4,553,304 | 11/1985 | Fleuret | 29/25.42 |

Primary Examiner—P. W. Echols
Assistant Examiner—Taylor J. Ross

Attorney, Agent, or Firm—Robert F. Meyer; Carl A. Forest

[57] ABSTRACT

A process for producing capacitors (9) of the stacked type envisages, in the order stated, a reel (4) being formed by simultaneously winding two superposed dielectric films 1, 2, around a support, the films being offset transversely and metallized on one side, the separation of the reel from the corresponding support e.g. by transverse shearing the reel (4), with the creation of one or more capacitive rods (6) extending rectilinearly, the metallization of the longitudinal end faces (6a) of each rod either before or after separation from the support (3: 10: 12: 14), and finally the transverse shearing of the metallized rod in order to produce individual capacitors 9, each of which of a predetermined capacitance. The rods (6), extending rectilinearly, have little or no internal pressure so show little tendency to delaminate and, furthermore, are readily handled for production of individual capacitors.

3 Claims, 20 Drawing Figures

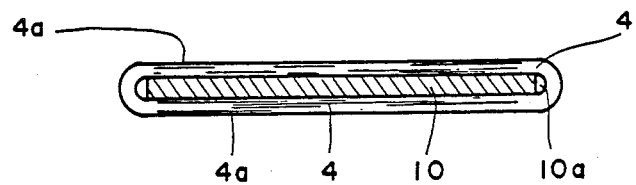
FIG. 6
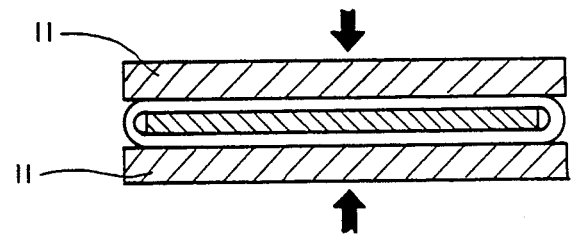
FIG. 7
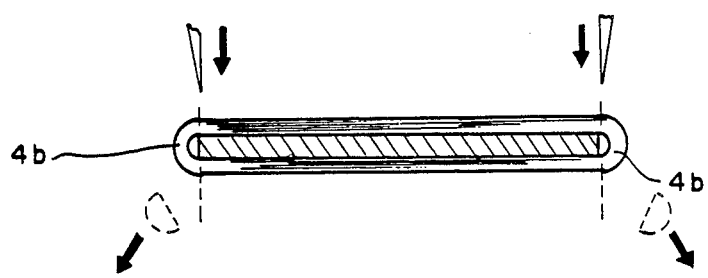
FIG. 8a
FIG. 8b
FIG. 9  FIG. 10
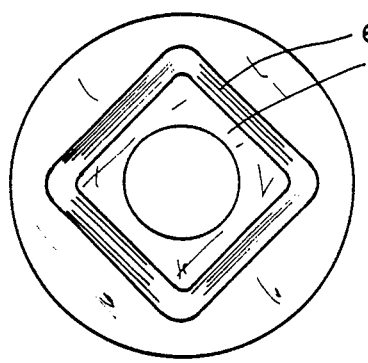
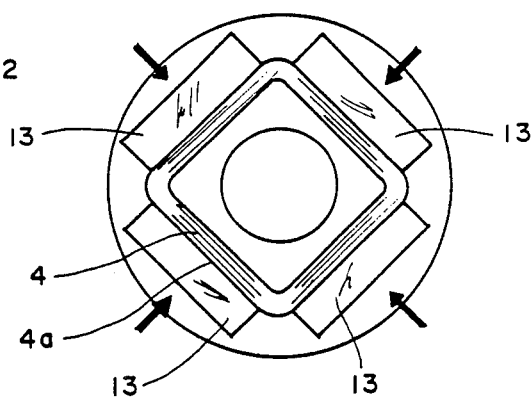

FIG. 12
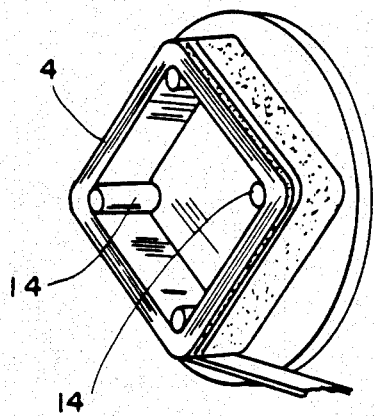
FIG. 11b
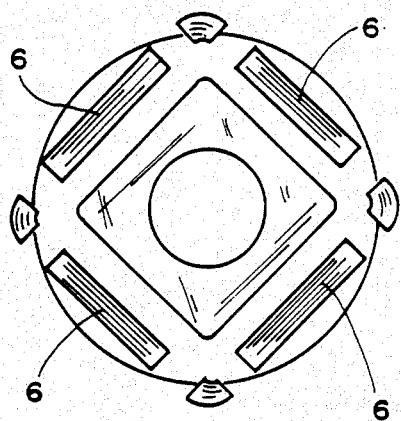
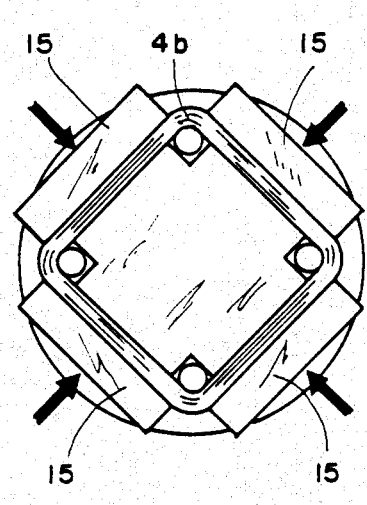
FIG. 13
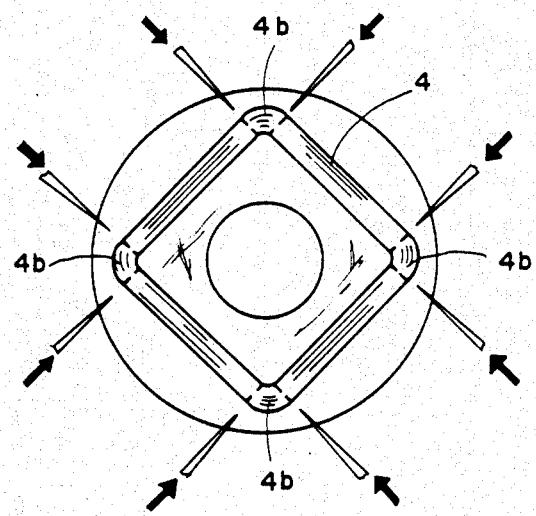
FIG. 11a

PRODUCTION OF CAPACITORS OF THE STACKED TYPE

This invention is concerned with the mass production of capacitors in layers or stacks.

Processes are known already for producing capacitors of this type; for example, in Netherlands Pat. Nos. 165 760 and 165 829 and U.S. Pat. No. 2,731,706, two dielectric films, one of the sides of which is metallized, are wound simultaneously onto a large diameter drum to form a mother capacitor. Although the two metallized dielectric films are generally identical in width, they are wound slightly offset one relative to the other so that it is possible subsequently to form lateral electrical connections (achieved by spraying metal) which, on one side, connect the films of positive polarity and, on the other, the films of negative polarity. Subsequently, the mother capacitor is divided (using known shearing means) with radial cuts, perpendicular to the winding turns, into individual capacitors whose shape is substantially parallelepiped, though with a slight curvature in the region of the two sides.

The processes mentioned above are uneconomical because the gauge of the mother capacitor, identical to that of the individual capacitors it is wishes to produce, is notable less than the diameter of the jet of the metal spraying means customarily used.

Also known, from German Pat. No. 892 321, is a process wherein the width of the mother capacitor is greater than the width of the individual capacitors it is wished to produce, these being formed by cutting the mother capacitor radially and perpendicularly to the axis thereof. This process is particularly complex since interruptions have to be provided in the metallized layers along the cutting planes, and since the said films are very thin it is practically impossible to perform the cutting operations without causing a number to be damaged. Another problem with this process lies in the difficulty of defining the cutting planes with precision.

The individual capacitors thus produced are metallized on both sides, this being done by sprays, so as to render them suitable for contact purposes; subsequently complicated and costly operations have to be carried out (the interrupted parts of the films in the mother capacitor have to be metallized) in order that only the metallized layers of the films belonging to one polarity have an electrical continuation with the corresponding sprayed side. In individual capacitors produced in this way there is no displacement exercises, as experts in the field will know, a positive effect on the electrical contact between the metallized side and the metallized layers of the films of the same polarity that are to be connected to that side.

In Italian Pat. No. 486 a process for producing a layer type capacitor is discussed, envisaging the formation of a plurality of concentric and consecutive mother capacitors, the inside mother capacitor being wound onto a drum of a diameter considerable greater than the gauge of each mother capacitor, the said mother capacitors being separated one from the other by inserts or layers that are capacitively ineffective (that is to say do not influence the determination of the capacitance parameter).

The unit constituted by the drum and by the plurality of mother capacitors is end metallized, radially compressed when necessary, and subjected to a predetermined temperature before or after the said metallization. The separation, one from the other, of the mother capacitors takes place in the region of the capacitively ineffective inserts or layers. Each mother capacitor yields, through radial cuts, two or more arcuate portions from which, again through radial cuts, the individual layer capacitors of a predetermined length are produced.

Difficulties with this process are numerous. It is, in fact, necessary to place, between one mother capacitor and the next, inserts or layers of sufficient elasticity to be bent into a cylindrical arrangement, each layer tightly enshrouding the associated mother capacitor and, in turn, being tightly enshrouded by the dielectric films inside the mother capacitor thereto. As mentioned previously, the individual capacitors are produced from the aforementioned arcuate portions.

It is therefore necessary to provide suitable storage units and infeed lines upstream of the means for cutting the arcuate portions; portions, the shape of these certainly not being optimal as regards the overall volume and the functional ability of the storage units together with that of the infeed lines.

It should be borne in mind that with the processes to which reference has just been made, individual layer capacitors are produced in arcuate form with only a very slight curvature, though sufficient to give rise to internal tension between the layers of film which, in time, could cause the capacitor to flake.

An object of the invention is to provide an improved process by which capacitors of the stacked type can be produced.

The invention provides a process for producing capacitors of the stacked type comprising in the order stated hereunder, the following steps: the simultaneous winding of two superposed films, each metallized on one side and with the metallized side of one film in contact with the non-metallized side of the other film, around a support until a reel made up of a predetermined number of turns is formed; the separation of the said reel from the corresponding support with the creation of at least one capacitive rod extending rectilinearly, the gauge of which is identical to that of the reel and, either before or after separation, the metallization of longitudinal end faces of the said rectilinearly extending capacitive rod; and the transverse shearing of the metallized rod to produce a plurality of individual capacitors, each of a predetermined capacitance.

A preferred process according to the invention comprises in the order stated hereunder, the following steps: the simultaneous winding of two superposed films, each metallized on one side and with the metallized side of one film in contact with the non-metallized side of the other film, around a stick-shaped support until a reel made up of a predetermined number of turns is formed, the reel comprising two elongated substantially rectilinear, parallel side portions at either side of the support connected by curved portions of small radius at either end of the support; the formation inside a frame, open at the front and rear, of a stack constituted by a number of superposed reels wound onto the corresponding supports, and by separation diaphragms, each interposed between two consecutive reels with a flat side portion of each reel in contact with the adjacent diaphragm and spacing the support from the diaphragm so that edge faces of the reels are exposed; the compression, at a predetermined pressure, of the said stack; the metallization, by spraying, of both the front and rear exposed faces of the said stack, the removal, through brushing, of layers of metallization deposited on the coated faces of the separation diaphragms and of the supports; the extraction of the stack from the frame and the separation of the reels from the diaphragms; the separation of each reel from the corresponding support and, either during or after separation of the reels from the support, the transverse shearing of the reels to remove the curved portions to provide at least two capacitive rods extending rectilinearly (corresponding with the parallel side portions of the reel), the gauge of each of which is identical to that of the reel; and the transverse shearing of each rod in order to produce a plurality of individual capacitors, each of a predetermined capacitance.

There now follow detailed descriptions, to be read with reference to the accompanying drawings of five processes embodying the invention. It will be realized that these processes have been selected for description to illustrate the invention by way of example:

FIGS. 6, 7, 8a and 8b show, diagrammatically, a second process embodying the invention;

FIGS. 9, 10, 11a and 11b show a third process embodying the invention;

FIGS. 12 and 13 show a fourth process embodying the invention;

Figure 1:
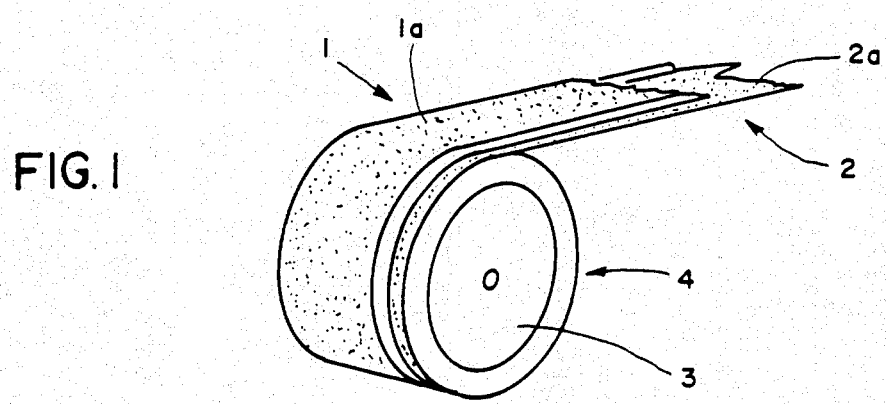
FIGS. 1, 2, 3, 4 and 5 show, diagrammatically various phases in a first process embodying the invention.
Figure 2:
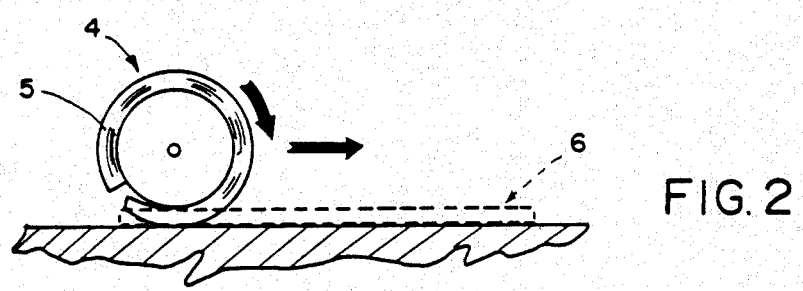
Figure 3:
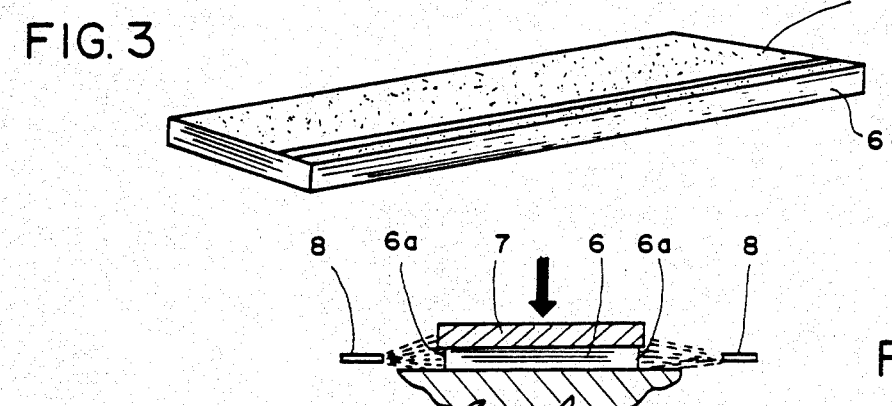
Figure 4:
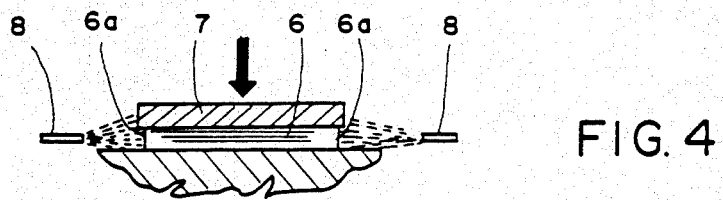
Figure 5:
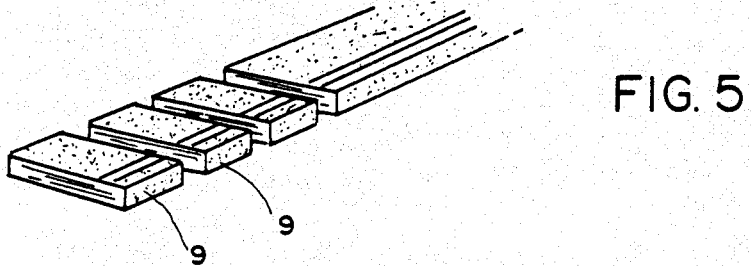
Figure 15:
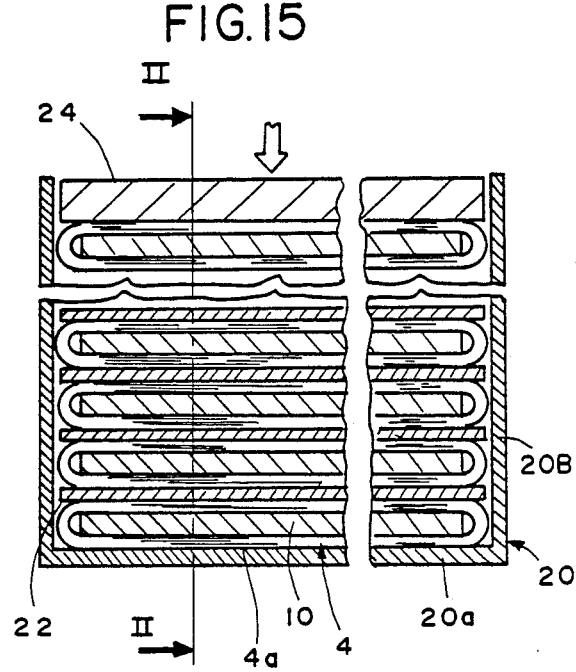
Figure 16:
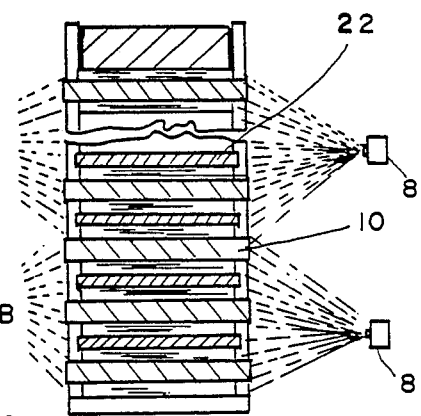
Figure 14:
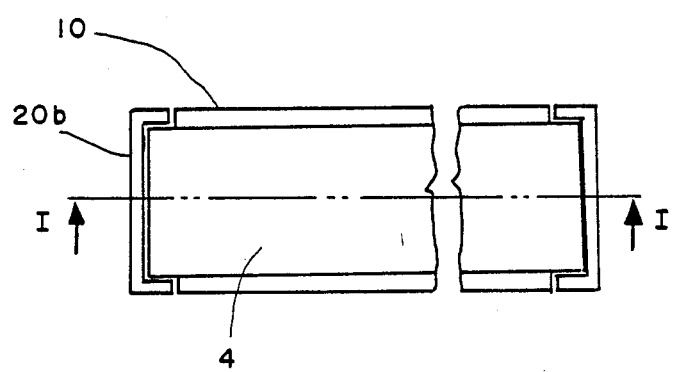
Figure 17:
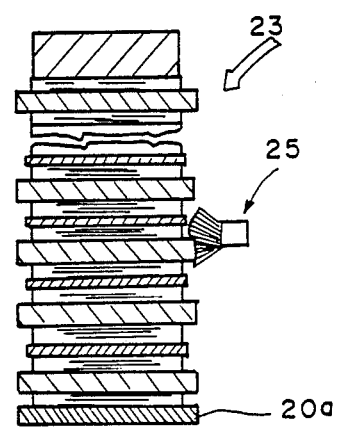
Figure 18:
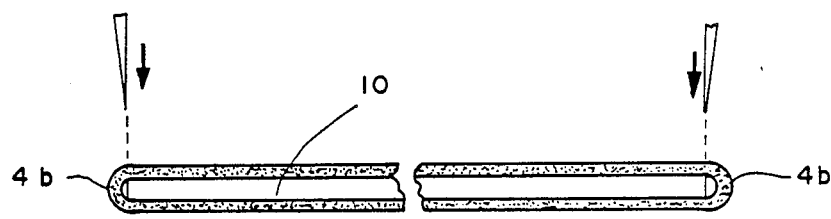

FIGS. 14, 15, 16, 17 and 18 show a further process embodying the invention and, in particular, FIG. 14 shows, from above, a containment frame for a stack of reels; FIG. 15 is a view along the line I—I in FIG. 14; FIGS. 16 and 17 are views along the line II—II in FIG. 15; and FIG. 18 shows, diagrammatically, the shearing phase of a reel wound onto the corresponding stick.

With reference to FIGS. 1 to 5, two dielectric films 1, 2 are shown, each having on one side a layer 1a, 2a of metallization, (in the order of a few microns or tens of microns in thickness).

Using known techniques, the said layers 1a and 2a do not extend over the full width of the film; in fact the layer of metallization is not applied to one longitudinal margin of each of the films.

The said films 1 and 2 are superposed longitudinally and slightly offset transversely (in accordance with the known art, see FIG. 1) in such a way that the layer of metallization 2a is in contact with the non-metallized side of the film 1, and the layer 1a is in contact with the non-metallized side of the film 2. The films 1, 2 are than wound simultaneously around a cylindrical support 3 (of circular section, for example) until a reel 4 made up of a predetermined number of turns is formed. Subsequently, the reel 4 is sheared, in a known way (not shown) on a cross section of the reel. An arcuate portion 5, defined by the shearing of the reel 4, is gradually separated from the support (FIG. 2) in such a way as to create a corresponding capacitive rod 6 extending rectilinearly (FIG. 3) with each piece of film being flat, the gauge of the rod 6 being identical with that of the reel 4. Means are provided to prevent the stack of superposed films 1, 2 from delaminating, and peeling (or flaking), at this point, but do not form part of the process claimed herein as an invention, and therefore are not shown in FIGS. 2 and 3.

The rod 6 thus produced is compressed (for example, at a predetermined temperature) by known pressing means 7, after which the longitudinally extending edge faces 6a of the rod 6 are metallized (in a known way) using known spraying means 8. The said spraying operation connects, as is known, at one of the edge faces 6a the layers of metal relating to one polarity (the layers 1a, for example) and at the other edge 6a, the layers of metal relating to the other polarity (that is, in the first process, the layers 2a).

Following the spraying operation, the rod 6 is sheared transversely in such a way as to produce a plurality of individual capacitors 9 of the required capacitance (for example, all of the same capacitance subject to predetermined tolerances).

Since the do not form part of the invention claimed herein, the means for storing the rods, for supplying these to the shearing station, and for the actual shearing operation, are not shown on the drawings.

In the second process embodying the invention (FIGS. 6, 7, 8a and 8b), the films 1 and 2 (which may be of any suitable width, depending upon the capacitor to be manufactured, for example the films maybe no more than 2.4 mm wide or as much as 27 cm wide.) are wound around a stick-shaped support 10 (that is, which is straight and relatively long but narrow, the dimensions being chosen according to the width and thickness of the capacitor to be manufactured and the support 10 suitable being reusable in which case it may conveniently be made of a suitable metal, e.g. a flat steel piece, brass, aluminum, or the like, or alternatively disposable, in which case it may be made of a suitably rigid disposable material, e.g. wood or rigid plastic, reinforced if necessary; e.g., with glass or carbon fibers). The ends 10a of the support 10 may conveniently be rounded off (see FIG. 6) to facilitate winding. The reel 4 thus formed comprises two elongated substantially rectilinear parallel side portions 4a at either side of the support 10, connected by curved portions of small radius at either end of the support 10. Once a reel 4 has been formed, the side portions 4a thereof are compressed (using known pressing means 11) against the stick-shaped support 10 (see FIG. 7). Subsequently, the reel is sheared in the region of curved end portions 4b (for example see FIG. 8a or, where the ends of the support 10 are rounded off, by a single cut along a plane lengthwise of the support to provide two bars with curved end portions which may be removed by cuts in the direction shown in FIG. 8a) and, in this way, two capacitive rods 6 are created, both of which extend rectilinearly (see FIG. 8b), the layers of film 1, 2 being flat. From the said rods, following the metallization of the longitudinal edge faces thereof as previously described, capacitors 9 are produced in the previously described way.

The third process embodying the invention (FIGS. 9, 10, 11a and 11b) envisages a reel 4 being formed on a support 12 of polygonal section (in particular a square, see FIG. 9, preferably having rounded corners). Here again, as in the previous instances, once the reel 4 has been formed, the sides 4a thereof are compressed (using known pressing means 13) against the corresponding sides of the support 12 (see FIG. 10). Subsequently, the reel is sheared in the region of curved portions 4b (see FIG. 11a) and, in this way four capacitive rods 6 are created, all of which extend rectilinearly (see FIG. 11b) and in which the layers of film are flat; from the rods 6, capacitors 9 are produced in the previously described way.

The fourth process embodying the invention (FIGS. 12 and 13) envisages the reel 4 being formed around three or more bars 14 parallel one to the other, defining a polygon (in the case illustrated, a square). Once a reel 4 has been formed, known pressing means 15 are used to compress the longitudinal sides thereof. Subsequently, as described in relation to the third process, the shearing of curved portions 4b of the reel leads to the creation of four capacitive rods 6 each extending rectilinearly and in which the layers of film are flat.

A major feature of processes according to the invention is the creation of capacitive rods 6 extending rectilinearly, constituted by a stack of elongated pieces of films 1, 2 which are flat and arranged so as to alternate systematically. This simplifies subsequent compression and metallization phases for the rods since the surfaces thereof are flat instead of being curved as is the case with the previously known processes hereinbefore discussed. Furthermore, handling of rectilinear capacitive rods is facilitated, for example stacking and storing thereof is simpler and more convenient than was the case with the processes resulting in curved rods discussed hereinbefore; insofar as the feeding of the rods to the shearing station is concerned, processes according to the invention in which rectilinearly extending rods are cut to form individual capacitors are very convenient.

In addition to the advantages to which reference has just been made are others resulting from yet a further process embodying the invention illustrated in FIGS. 14 to 18.

FIGS. 14 and 15 show a frame 20 comprising a base 20a and two vertical C section walls 20b. Inside the frame 20 a plurality of reels 4 wound on corresponding stick-shaped supports 10 (in the manner previously described with reference to FIG. 6) and a plurality of separation diaphragms 22, made either of metal or of synthetic resin, are placed alternately to form a stack 23. Each separation diaphragm 22 is interposed between two similar consecutive reels (see FIGS. 15, 16 and 17) with a flat side portion of each reel in contact with the adjacent diaphragm thus spacing the support from the diaphragm with edge faces of the reels formed by edges of the films wound round the support, exposed.

Using known pressing means 24, a predetermined amount of pressure is applied to the stack 23 and this is maintained whilst the exposed side faces of the stack are being metallized by metal spraying means 8 of a known type; the spraying operation can be effected thanks to the fact that the front and rear sides of the frame 20 are open.

The areas of the side faces of the stack are considerably greater than the section of the jet of the spraying means; this simplified and, at the same time, speeds up the spraying phase thereby increasing the efficiency thereof. The sole area of each reel that is either not metallized or unsatisfactorily metallized is that of the curved ends 4b which, as will be explained below, are not used in the formation of the capacitive rods.

Prior to or following the spraying of the exposed side faces of the stack, thermal stabilization of the reels can be effected: This is done by subjecting the stack 23 to a predetermined temperature maintained for a predetermined period of time.

Subsequently to the spraying phase (or to eventual thermal stabilization) steps are taken to remove metallization burr from the stick-shaped supports 10 and from the separation diaphragms 22; this is in the form of brushing with the aid of known brush means 25. The removal from the edge faces of the stick-shaped supports 10 and from the edge faces of the diaphragms 22 of the sprayed metal is accomplished easily since the surfaces sprayed are smooth; however, the metal sprayed onto the edge faces of the reels is not removed by the brush means 25 because the edge faces are constituted by a rough surface (namely the turns of the reel) to which the metal firmly attached itself. After the brushing operation has finished, the stack 23 is decompressed and the reels 4 are extracted from the frame 20 along with the corresponding diaphragms 22. The separation of the reels 4 one from the other is facilitated by the diaphragms 22 since these, after the brushing operation, constitute an interruption in the layer of metal sprayed on the edge faces of any two consecutively placed reels 4.

At this juncture, as illustrated in FIGS. 8a and 8b, the shearing of the ends 4b of each reel 4 creates at least two capacitive rods 6 each extending rectilinearly and in which the layers of film are flat, and the transverse shearing of these produces a plurality of individual capacitors 9. Alternatively the supports (10) may be first removed from the reels (e.g. by pushing using suitable apparatus, not shown), the metallization ensuring that the reels are sufficiently rigid and stable to retain their rectilinear form, the ends 4b then being sheared (see FIG. 18).

The individual capacitors 9 produced by a process embodying the invention are strictly in the form of parallelepipeds without any curvature (even very slight), and are thus clearly distinguished from the capacitors produced by the prior art processes involving so-called mother capacitors of arcuate form discussed above. The stack of superposed pieces of the films 1, 2 that constitutes each capacitor therefore has little or no tendency to peel and/or flake since no internal tension sufficient to cause this, exists.

No mention has been made in the foregoing description of the means and/or processes by which corresponding terminals are connected to the metallized ends of the capacitors 9 since such means and/or processes are well known in the manufacture of conventional wound film capacitors.

I claim:

1. A process for producing capacitors of the stacked type, characterized in that the process comprises, in the order stated hereunder, the following steps: the simultaneous winding of two superposed films (1, 2), each metallized on one side (1a, 2a) and with the metallized side (1a, 2a) of one film (1, 2) in contact with the non-metallized side of the other film (2, 1), around a stick-shaped support (10) until a reel (4) made up of a predetermined number of turns is formed, the reel (4) comprising two elongated substantially rectilinear, parallel side portions (4a) at either side of the support (10) connected by curved portions (4b) either end of the support (10); the formation inside a frame (20), open at the front and rear, of a stack (23) constituted by a number of superposed reels (4), wound onto the corresponding supports (10), and by separation diaphragms (22), each interposed between two consecutive reels (4) with a flat side portion of each reel (4) in contact with the adjacent diaphragm (22) and spacing the support from the diaphragm so that edge faces (6a) of the reels (4) are exposed; the compression, at a predetermined pressure, of the said stack (23); the metallization, by spraying, of both the front and rear exposed faces of the said stack; the removal, through brushing, of layers of metallization deposited on the coated faces of the separation diaphragms (22) and of the supports (10); the extraction of the stack (23) from the frame (20) and the separation of the reels (4) from the diaphragms (22); the separation of each reel (4) from the corresponding support (10)

and, either during or after separation of the reels (4) from the support (10), the transverse shearing of the reels (4) to remove the curved portion (4b) to provide at least two capacitive rods (6) extending rectilinearly, the gauge of each of which is identical to that of the reel (4); and the transverse shearing of each rod (6) in order to produce a plurality of individual capacitors (9), each of a predetermined capacitance.

2. A process according to claim 1, characterized in that prior to the metallization of the two faces of the stack (23), thermal stablization is effected with the said stack (23) being kept at a predetermined temperature.

3. A process according to claim 1, characterized in that following the metallization of the two faces of the stack (23), thermal stabilization is effected with the said stack (23) being kept at a predetermined temperature.

* * * * *